(12) United States Patent
Lazaroff et al.

(10) Patent No.: US 6,786,140 B1
(45) Date of Patent: Sep. 7, 2004

(54) LOCKING FONDUE ASSEMBLY

(75) Inventors: William J. Lazaroff, Floral Park, NY (US); Mark P. F. Bechtold, Northport, NY (US)

(73) Assignee: Lifetime Hoan Corporation, Westbury, NY (US)

( * ) Notice: Subject to any disclaimer, the term of this patent is extended or adjusted under 35 U.S.C. 154(b) by 0 days.

(21) Appl. No.: 10/609,352

(22) Filed: Jun. 30, 2003

(51) Int. Cl.[7] .................. A47J 37/12; A47J 37/04; A23L 1/00
(52) U.S. Cl. .................. 99/413; 99/403; 99/419; 99/448; 126/43
(58) Field of Search .................. 99/330, 448, 403–418, 99/419–421 V, 444–446; 126/43, 369; 248/110, 689; D7/355; D6/582; 219/432, 252, 433, 436, 448, 17, 521, 459.1, 441, 435, 430

(56) References Cited

U.S. PATENT DOCUMENTS

| | | | | |
|---|---|---|---|---|
| 3,038,402 A | * | 6/1962 | Singer | 99/403 |
| 4,366,750 A | * | 1/1983 | Brown et al. | 99/421 V |
| 5,154,116 A | * | 10/1992 | Dube | 99/403 |
| 5,749,286 A | * | 5/1998 | Payette | 99/413 |
| D433,272 S | * | 11/2000 | Park | D7/355 |
| D448,237 S | * | 9/2001 | Bodum | D7/355 |

* cited by examiner

Primary Examiner—Timothy F. Simone
(74) Attorney, Agent, or Firm—Goodman & Teitelbaum, Esqs.

(57) ABSTRACT

The resent invention provides a locking fondue assembly including a pot assembly, a stand assembly and a burner assembly. Each assembly securely connects during use minimizing operator risk and increasing operator convenience. A pot lids locks onto a fondue pot and minimizes the risk of hot liquids from escaping. The fondue pot removably locks into a stand assembly and includes thermally distanced legs allowing immediate positioning on available work surfaces. A weight burner base assembly lockably secures a burner and minimizes the risk associated with a top-heavy fondue assembly.

12 Claims, 6 Drawing Sheets

LOCKING FONDUE ASSEMBLY

BACKGROUND OF THE INVENTION

1. Field of the Invention

The present invention relates to a locking fondue assembly. More specifically, the present invention relates to a locking fondue assembly that includes at least a pot assembly, a stand assembly, and a burner assembly while providing improved operator safety features.

2. Description of the Related Art

Conventionally available fondue assemblies commonly include a fondue pot having handles and a top opening for accessing the molten fondue with fondue forks. Often there is a separate heating assembly that supplies electrical or flame heat to the bottom of the fondue pot to keep the fondue warm during use.

Unfortunately, conventional fondue pot assemblies have many common detriments which can cause damage to a table or other work surface, increase user risk, and make it difficult to neatly eat from fondue assembly. Often conventional fondue pots having legs, allow the legs to be heated directly by he heating element itself. Conventional legs are often as hot as the bottom of the conventional fondue pot itself. Consequently, it is impossible to remove a warm fondue pot from the heating assembly and place it on a work surface for easy access or replenishment since the legs will burn or mar the work surface. Where conventional fondue assemblies lack legs, then placing the hot pot bottom on a work surface causes similar damage.

Additionally, conventional fondue pots lack secure lids to retain fondue forks during transportation and use. Conventional fondue pot lids are often fall or shift off a pot top accidentally while the hot fondue is being accessed by fondue forks. As with conventional fondue pot lids, it is easy to knock a conventional fondue pot off a conventional stand and spill the hot liquid contents. Conventional fondue pots are not locked into a heating assembly and consequently increase burning risks.

Conventional burner assemblies often require specially formed types of burners or different types of fuels, limiting broad-spectrum distribution to a worldwide market. Additionally, conventional burners or fuel sources are easily tipped out of or away from a burner base risking fire damage to surrounding materials. Often conventional burner bases are detrimentally lightweight and provide little stability to the typically top-heavy fondue assembly.

In summary, the problems of conventionally available fondue assemblies Include:

1. Lose pots and lids that are easily displaced by accident
2. Loose fondue forks during use and transport.
3. Loose burner or heater assemblies.
4. Hot pot legs that can damage a work surface.

OBJECTS AND SUMMARY OF THE INVENTION

An object of the present invention is to overcome the detriments noted above and provide a safe, secure, and user-friendly locking fondue apparatus.

It is another object of the present invention is to provide a fondue pot assembly with a lid that locks to a pot assembly and a pot assembly which positively locks to a stand and burner assembly.

It is another object of the present invention to provide a fondue pot assembly with a secure burner assembly that locks a heat source in to position and prevents accidental separation.

It is another object of the present invention to provide a fondue pot assembly having a fondue pot with distancing legs that space the pot from a work surface and minimize work surface damage.

The present invention relates to a locking fondue apparatus that provides a locking fondue assembly including a pot assembly, a stand assembly and a burner assembly. Each of these assemblies securely connects together during use minimizing operator risk and increasing operator convenience. A pot lid locks onto a fondue pot and minimizes the risk of hot liquids from escaping. The fondue pot removably locks into a stand assembly and includes thermally distanced legs allowing immediate positioning on available work surfaces. A weighted burner base assembly lockably secures a burner and minimizes the risks associated with a top-heavy fondue assembly.

According to an embodiment of the present invention there is provided a locking fondue assembly, comprising: a pot assembly, the pot assembly including a pot body and a pot lid, a snap lock means at a top of the pot body releasably securing the pot lid to the pot body, a stand assembly, the stand assembly including a stand base spaced from a stand top by a plurality of stand legs, locking means for detatachably attaching the pot assembly to the stand assembly, a burner assembly in the stand base opposite the pot assembly, and the burner assembly including means for elastically securing a burner cup in a burner receptacle positioned coaxially to a central axis of both the pot assembly and the stand assembly, whereby the locking fondue assembly prevents unintended separation and increases safety during a use by interlocking the pot assembly with both the stand assembly and the burner assembly.

According to another embodiment of the present invention there is provided a locking fondue assembly, further comprising: a plurality of pot feet extending radially away from the pot body opposite the top of the pot body, and the locking means enabling a rotational engagement between the plurality of pot feet and the stand assembly when the pot body is rotated in a locking direction and enabling a rotational disengagement of the plurality of pot feet when the pot body is rotated in an opposing unlocking direction.

According to another embodiment of the present invention there is provided a locking fondue assembly, wherein: the plurality of pot feet are spaced apart from both a bottom of the pot body and from the burner assembly, the burner assembly including a burner cover on the burner cup, the burner cover having a burner handle extending away from the central axis, and the burner cover shielding the plurality of pot feet during the use, whereby the plurality of feet remain at a temperature suitable for placement on a work surface during a disengagement of the pot assembly from the stand assembly.

According to another embodiment of the present invention there is provided a locking fondue assembly, further comprising: a burner snap lock assembly in the means for elastically securing, a burner cup edge extending from a bottom portion of the burner cup, and the burner snap lock assembly elastically engaging the burner cup edge during the use, thereby elastically retaining the burner cup In the burner assembly during the use and preventing unintended burner cup separation from the stand assembly According to another embodiment of the present invention there is provided a locking fondue assembly, wherein: the locking means includes a stand top and a stand cover plate, the stand top and the stand cover plate joined coaxially along the center axis, a plurality or first pot leg rotation guides on the stand cover plate, a plurality of second pot leg rotation guides on the stand top, a stop tab extending parallel to the central axis from each the first pot leg rotation guide, a stand top locking mechanism extending from each the second pot leg rotation guide, and each the pot leg respectively engaging at least one of the stand top locking mechanism and the stop tab during the use as the pot body is rotated in the locking direction, whereby the plurality of pot legs lockably engage with at least one of stand top and the stand cover plate and positively link the pot assembly with the stand assembly.

According to another embodiment of the present invention there is provided a locking fondue assembly, wherein: the stand top locking mechanisms each include at least a sloped portion, a flat portion, and an edge portion, whereby, during the use as the pot body is rotated in the locking direction respective the pot feet slidably engage respective the sloped portion and draw the pot assembly tightly to the stand assembly.

According to another embodiment of the present invention there is provided a locking fondue assembly, further comprising: at least one pot lid spring member extending from the pot lid in the snap lock means, and the at least one pot lid spring member elastically engaging the top of the pot body, whereby pot lid is elastically retained in the pot assembly during the use.

According to another embodiment of the present invention there is provided a locking fondue assembly, further comprising: a pot lid opening in the pot lid, the pot lid opening being coaxial to the central axis, a plurality of fork slots radially arrayed about the pot lid opening relative to the central axis, and during the use the locking fondue assembly enables at least one external fork member to insert through the pot lid opening and be removably retained by one of the plurality of fork slots.

The above, and other objects, features and advantages of the present invention will become apparent from the following description read in conduction with the accompanying drawings, in which like reference numerals designate the same elements.

DETAILED DESCRIPTION OF THE PREFERRED EMBODIMENTS

Figure 1:
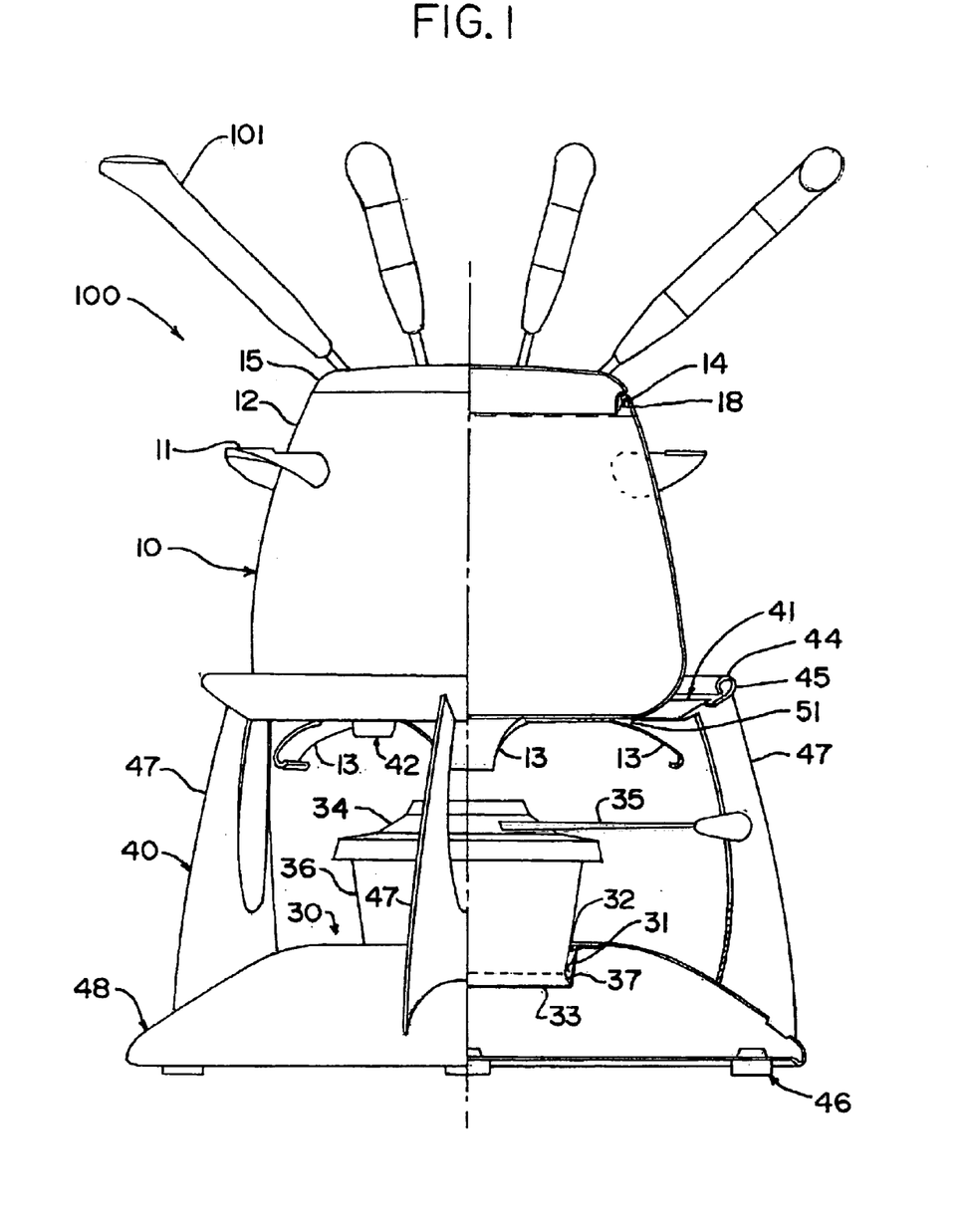
FIG. 1 is partially cut away perspective view of a locking fondue assembly according to one embodiment of the present invention.

Referring now to FIG. 1, a locking fondue assembly 100 includes a pot assembly 10, a stand assembly 40 and a burner assembly 30. A plurality of conventional fondue forks 101, extend from a top of pot assembly 10 to access hot liquid contained in pot assembly 10.

Pot assembly 10 includes a pot body 12 having three feet 13 opposite a pot lid 15 (alternatively snap lid 15). A pair of handles 11 extend outwardly from pot body 12, as shown. A pot lid snap lock assembly 14 positively engages pot lid spring 18 (a leaf spring) extending from pot lid 15, and secures pot lid 15 to pot body 12. In this manner the present invention prevents pot lid 15 from sliding and protectively covers any hot liquid contained in pot body 12. As shown, pot feet 13 extend away from a bottom surface of pot body, away from burner assembly 30. Consequently, pot feet 13 are not directly heated during operation of locking fondue assembly 100, and pot assembly 10 may be disengaged from stand assembly 40 and transported to a desired work surface without risk of thermal damage to the work surface. It is noted that the feet 13 aid in securing the base assembly both when the pot is engaged and when the pot is removed.

Stand assembly 40 includes a stand cover plate 41, a stand top 44 supported by a set of three stand feet 47 rising from a stand base 48. Stand base 48 may be weighted by any conventional means to increase a stability of locking fondue assembly 100. A set of elastomeric or rigid plastic stand feet 46 extend from a bottom of stand base 48, as shown, and provide a non-slip grip to a work surface.

A rolled bead 45 extends around an outer diameter of stand top 44 and eases assembly between pot assembly 10 and stand assembly 40. Stand top 44 includes three stand top locking mechanism 51 (one shown), as will be described. A set of three stop tabs 42 (one shown) extend downward from a bottom of stand cover plate 41. During an assembly stand cover plate 41 is centered and welded to stand top 44 as shown. When pot assembly 10 is installed in stand assembly 40, feet 13 contact respective stop tabs 42 and are slidably guided along stand top locking mechanisms 51, thereby locking pot body 12 to stand assembly 40 and preventing spills.

Burner assembly includes stand base 48 and a centered burner receptacle 32 having a bottom burner support 33. A burner snap lock assembly 31 (leaf spring) surrounds an outer edge of burner receptacle 32. It is clear that other methods of attachment can be used for locking the burner, all of which would be known to one skilled in the art.

A burner cup 36 includes a burner cover 34 (lid 34) having a guiding burner handle 35 that allows easy placement of burner cup 36 in burner receptacle 32. A bottom of burner cup 36 includes an outward burner cup edge 37 that positively engages burner snap lock assembly 31 and removably locks burner cup 36 into stand base 48.

Figure 2:
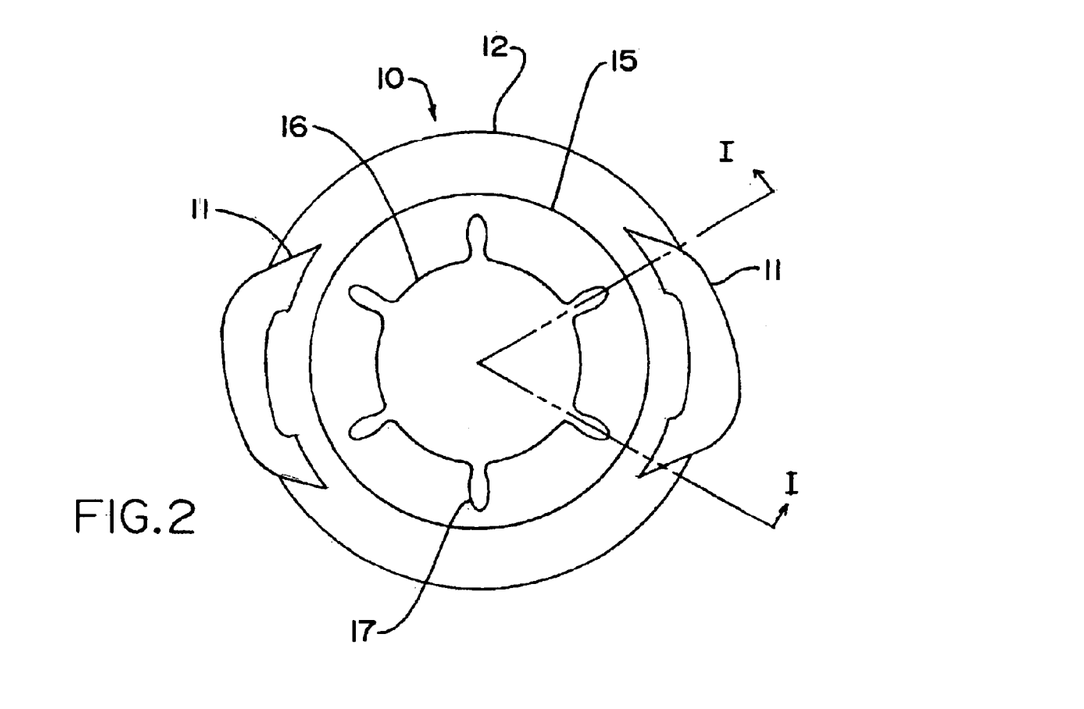
FIG. 2 is a top view of the pot assembly in the present invention.
Figure 3:
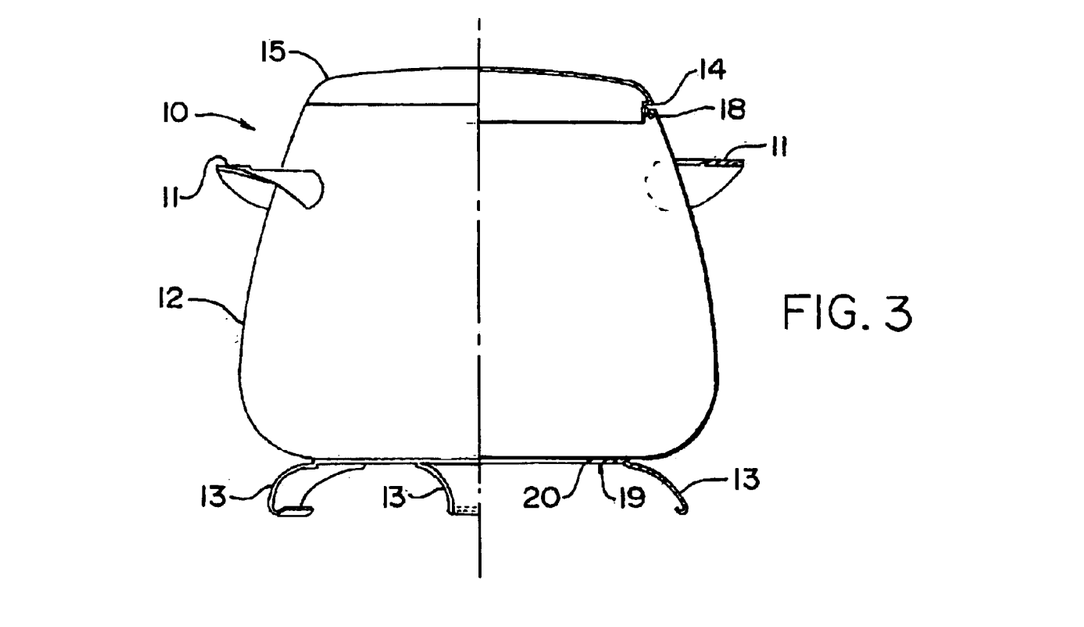
FIG. 3 is a side view of pot assembly with a partial sectional view along line I—I in FIG. 2.
Figure 4:
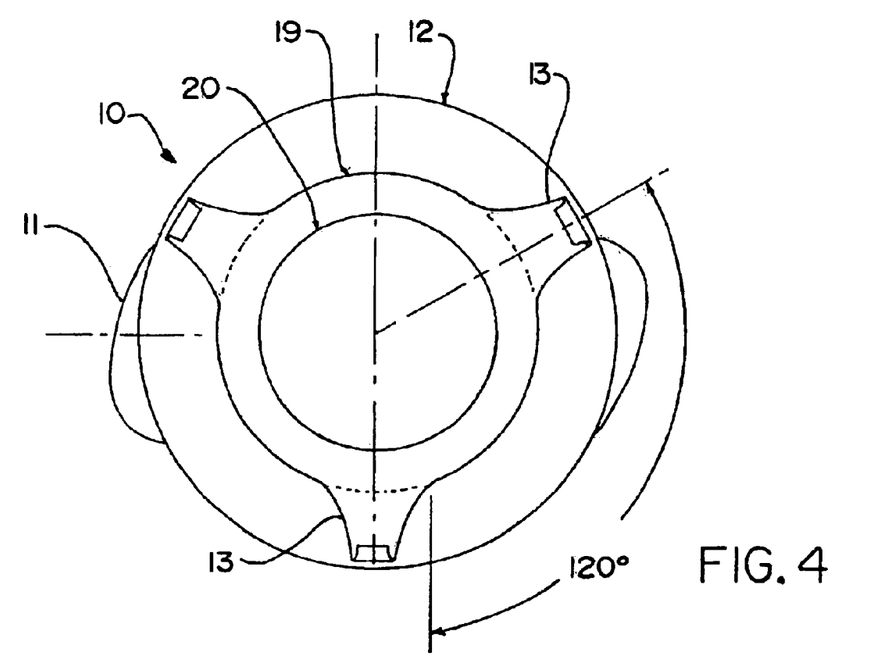
FIG. 4 is a bottom view of the pot assembly in the present invention.
Figure 5:
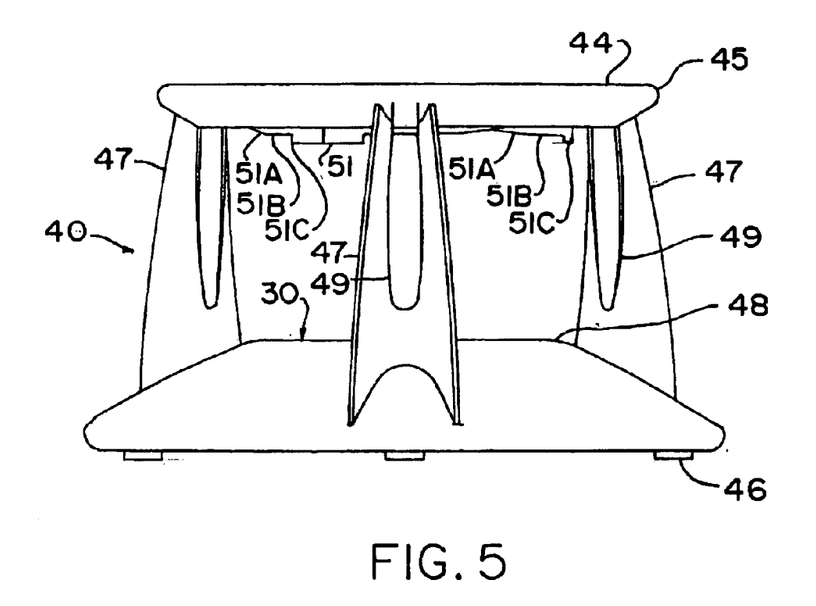
FIG. 5 is a perspective view of a stand assembly with a stand cover plate according to the present invention.
Figure 6:
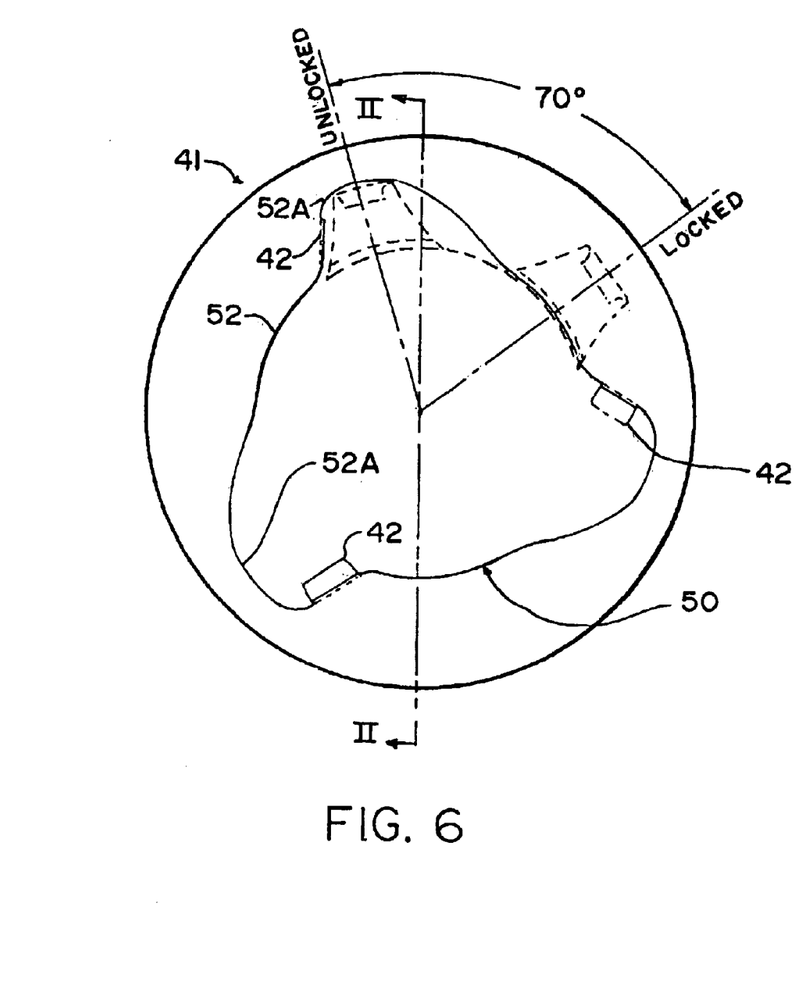
FIG. 6 is a partial top view of the burner stand assembly cover plate indicating a locked and unlocked position.
Figure 7:
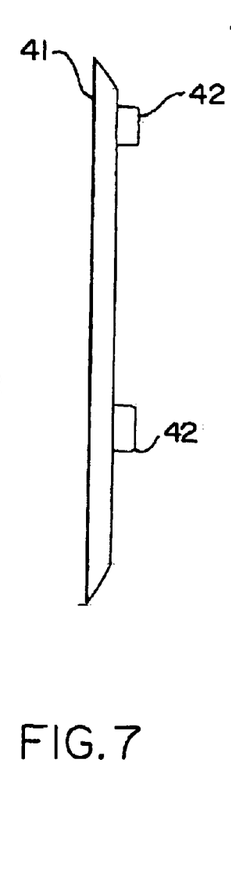
FIG. 7 is a front view of a burner stand cover plate.
Figure 8:
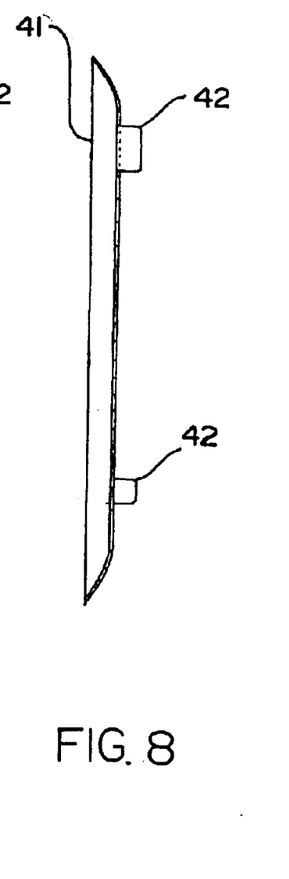
FIG. 8 is a sectional view of the burner stand cover plate along line II—II in FIG. 6.

Referring now to FIGS. 2 through 4, pot lid 15 includes a central pot lid opening 16 having a plurality of fork slots 17. Fondue forks 101 (shown in FIG. 1) are laterally retained in respective fork slots 17 during use or transport of pot assembly 10. Since pot lid opening 16 is narrower than a top opening (not shown) of pot body 12 fondue forks 101 are less able to unintentionally shift and fall out during use. As can be seen, handles 11 extend beyond an outer circumference of pot body 12 and enable easy access to control pot assembly 10.

Pot feet 13 extend radially from a pot foot ring 19 bounding a pot foot ring opening 20 on a bottom of pot body 12. As shown, pot feet 13 are arrayed arranged 120 degrees apart along pot foot ring 19. Pot fool ring opening 20 allows eat from burner cup 36 to directly contact a bottom of pot body 12 and prevents direct heating of pot feet 13. Since pot feet 13 are not in a direct heating path, do not receive direct heating from burner cup 36, and act as heat radiators, pot feet 13 remain substantially cooler than pot body 12. Consequently, a user may unlock pot body 12 and place pot feet 13 directly on a work surface (not shown) without fear of thermally damaging the work surface.

Referring now to FIGS. 5 through 8, stand legs 47 each include a decorative and weight reducing leg opening 49. Stand assembly 40 rigidity supports stand top 44. The top and bottom of respective stand legs 47 are spot welded to respective positions on stand top 44 and stand base 48. As noted above, since stand base 48 may be weighted upon manufacturer desire, stand assembly 40 easily provides a rigid base to pot assembly 10.

Stand cover plate 41 surrounds an irregularly shaped cut out 50. Irregularly shaped cut out 50 includes three quadrants for receiving each of the three pot feet 13. Cut out 50 includes three pot leg rotation guide surfaces 52 and three respective guide end receptacles 52A separated by 120 degrees. Guide end receptacles 52A are located at the end of each rotation guide surface 52. Each rotation guide surface 52 follows an increasing radius from a central point cut out 50, as shown.

During use, stand cover plate 41 is secured coaxial to stand top 44. As pot feet 13 are inserted first through respective guide receptacles 52A, each pot foot 13 is in an unlocked position (shown), as pot body 12 is prevented from rotating in an unlocked direction by stop tabs 42. As a user cannot initially rotate pot body 12 in the unlocked direction, the user is forced to rotate pot body in a locking direction to a locked position (shown). During this insertion and rotation step, pot feet 13 encounter pot leg rotation guide surfaces 52 and maintain pot body 12 coaxial to locking fondue assembly 100. Additionally, as each rotation guide surface 52 in cut out 50 becomes narrower in the locking direction, pot feet 13 are retained blow stand cover plate 41 lock pot assembly 10 to stand assembly 40.

As an additional stabilization feature, stand top locking mechanisms 51 include respective sloped portions 51A and flat portion 51B. When pot body 12 is positioned in stand top 44, pot feet 13 extend through stand cover plate 41 and stand top 44, into respective guide end receptacles 52A. As pot feet 13 rotate in the locking direction, feet encounter both rotation guide 52 and respective sloped portions 51A on stand top 44. During locking rotation, while rotation guides 52 maintain pot body 12 in a coaxial position, sloped portions 51A act to squeeze pot assembly into stand assembly and stand top 44. After squeezing, pot feet 13 slide along flat portions 51B until encountering an edge 51C of stand top locking mechanism 51 (hard edge), and coming to a rotational stop.

During the locking rotation, pot assembly 10 is rotated through 70 degrees from the unlocked position to a locked position. While pot feet 13 are positioned 120 degrees apart, sloped sides of pot feet 13 extend outward and encounter a maximum locked position after 70 degrees of rotation.

Figure 9:
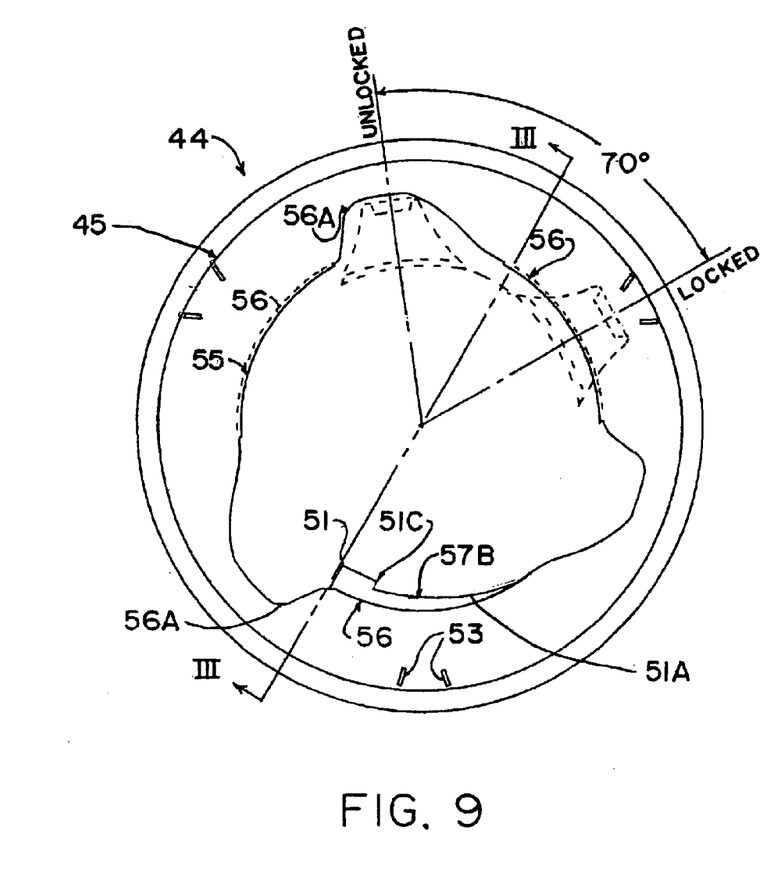
FIG. 9 is a top view of the stand assembly indicated a locked and unlocked position.
Figure 10:
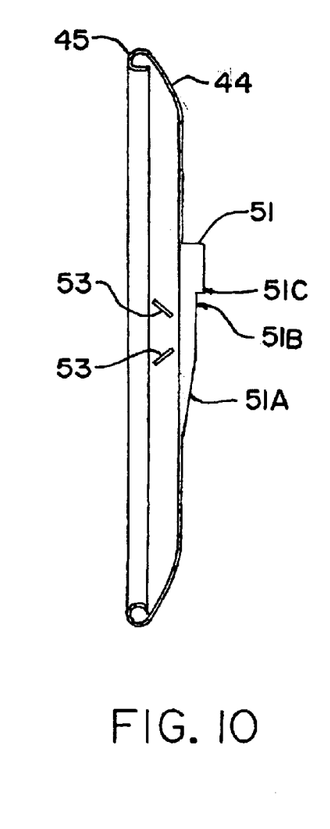
FIG. 10 is a sectional view of a stand top along line III—III in FIG. 9.

Referring now to FIGS. 9 through 10, stand top 44 includes bead 45 along an outer circumference, as shown. A generally centered cut out 55 aligns with cut out 50 in stand cover plate 41. Cut out 55 also includes three pot fee rotation guides 56 ending in respective guide end receptacles 56A. Here, rotation guides 56 in stand top 44 generally align with pot leg rotation guides 52 on stand cover plate 41. Additionally, guide end receptacles 56A in stand top 44 align with guide end receptacles 52A.

Three pairs of leg slots 53 are arrayed around an outer rim of stand top 44. During an assembly, tops of respective stand legs 47, separated into top portions by leg openings 49, are positioned in respective leg slots 53 and welded to stand top 44.

As noted above, as pot assembly 10 is rotated through 70 degrees from the unlocked position to a locked position, pot feet encounter stand top locking mechanism 51 and slide along sloped portion 51A to flat portion 51B until encountering edge 51C. In this manner, pot assembly 10 is rotationally and releaseably locked to stand assembly 40.

Figure 11:
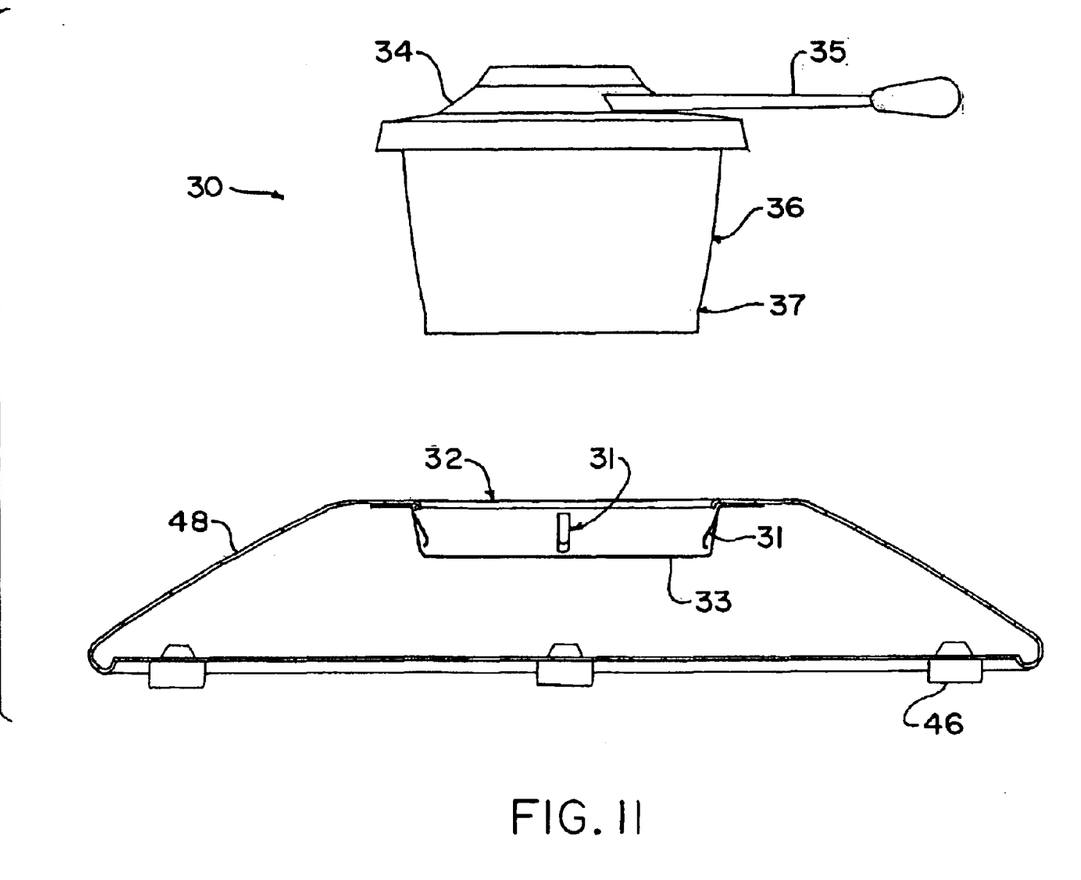
FIG. 11 is an exploded side view of the burner assembly.

Referring now to FIG. 11, burner assembly 30 includes stand base 48, having burner receptacle 32. Burner snap lock assembly 31 (leaf springs 31) are arrayed around an outer circumference of burner receptacle 32, above burner support 33.

During an assembly, a heating means such as Sterno®(not shown) is placed in burner cup 36. Burner cover 34 is secured to burner cup and an operator employs burner handle 35 to position burner cup 36 in burner receptacle 32. The operator then pushes on burner handle 35 to force burner snap locks 31 to elastically engage expanded burner cup edge 37. In this manner, burner cup 36 is removably secured to burner assembly 30 and cannot be accidentally removed. Additionally, since burner cover 34 (burner lid) protects the heating means and is secured to burner cup 36, even after tipping burner assembly 30, the heating means is retained securely and safely. As mentioned above, when stand base 48 is weighted, locking fondue assembly 100 is substantially stabilized minimizing tipping and spilling hazards.

In the claims, means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies entirely on friction between a wooden part and a cylindrical surface, a screw's helical surface positively engages the wooden part, and a bolt's head and nut compress opposite sides of at least one wooden part, in the environment of fastening wooden parts, a nail, a screw, and a bolt may be readily understood by those skilled in the art as equivalent structures.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the spirit and scope of this invention as defined in the following claims.

What is claimed is:

1. A locking fondue assembly, comprising:

A locking fondue assembly comprising:

a pot assembly;

said pot assembly including a pot body and a pot lid;

snap lock first means at a top of said pot body for releasably securing said pot lid to said pot body;

a plurality of pot feet extending away from said pot body opposite said top of said pot body;

a stand assembly;

locking second means for detatachably securing said pot assembly to said stand assembly;

said locking second means providing a rotational engagement between said plurality of pot feet and said stand assembly when said pot body is rotated in a locking direction, and also providing a rotational disengagement of said plurality of pot feet when said pot body is rotated in an opposing unlocking direction; and a burner assembly in said stand assembly opposite said pot assembly;

whereby said locking fondue assembly prevents unintended separation and increases safety during a use thereof.

2. A locking fondue assembly, according to claim 1, wherein:

said pot feet extend radially away from said pot body.

3. A locking fondue assembly, according to claim 1, wherein:

said stand assembly includes a stand base spaced from a stand top by a plurality of stand legs.

4. A locking fondue assembly, according to claim 1, wherein:

said snap lock first means and said locking second means prevent unintended separation of said locking fondue assembly by interlocking said pot assembly with both said stand assembly and said burner assembly.

5. A locking fondue assembly, according to claim 1, wherein:

said burner assembly includes a burner cup and a burner receptacle; and third means for elastically securing said burner cup in said burner receptacle, so that said burner cup is positioned coaxially to a central axis of both said pot assembly and said stand assembly.

6. A locking fondue assembly, according to claim 5, wherein:

said plurality of pot feet are spaced apart from both a bottom of said pot body and from said burner assembly;

said burner assembly including a burner cover on said burner cup;

said burner cover having a burner handle extending away from said central axis; and said burner cover shielding said plurality of pot feet during said use thereof, so that said plurality of pot feet remain at a temperature suitable for placement on a work surface during a disengagement of said pot assembly from said stand assembly.

7. A locking fondue assembly, according to claim 6, further comprising:

a burner snap lock assembly in said third means for elastically securing a burner cup edge extending from a bottom portion of said burner cup; and said burner snap lock assembly elastically engaging said burner cup edge during said use thereof, thereby elastically retaining said burner cup in said burner receptacle during said use thereof and thus preventing unintended burner cup separation from said stand assembly.

8. A locking fondue assembly, according to claim 1, wherein:

said locking second means includes a stand top and a stand cover plate;

said stand top and said stand cover plate being joined coaxially along a center axis of both said pot assembly and said stand assembly;

a plurality of first pot feet rotation guides being provided on said stand cover plate;

a plurality of second pot feet rotation guides being provided on said stand top;

a stop tab extending parallel to said central axis from each of said first pot feet rotation guides;

a stand top locking mechanism extending from each of said second pot feet rotation guides; and each of said pot feet respectively engaging at least one of said stand top locking mechanism and said stop tab during said use thereof, as said pot body is being rotated in said locking direction, so that said plurality of pot feet lockably engage with at least one of stand top and said stand cover plate, and thus positively link said pot assembly with said stand assembly.

9. A locking fondue assembly, according to claim 8, wherein:

each of said stand top locking mechanisms include at least a sloped portion, a flat portion, and an edge portion, so that during said use thereof, as said pot body is being rotated in said locking direction, said pot feet slidably engage respective ones of said sloped portions and draw said pot assembly tightly to said stand assembly.

10. A locking fondue assembly, according to claim 1, further comprising:

at least one pot lid spring member extending from said pot lid in said snap lock first means; and said at least one pot lid spring member elastically engaging said top of said pot body, so that said pot lid is elastically retained in said pot assembly during said use thereof.

11. A locking fondue assembly, according to claim 10, further comprising:

a pot lid opening in said pot lid;

said pot lid opening being coaxial to a central axis of both said pot assembly and said stand assembly;

a plurality of fork slots being radially arrayed about said pot lid opening relative to said central axis; and during said use thereof, said locking fondue assembly permits at least one external fork member to be inserted through said pot lid opening and be removably retained therein by one of said plurality of fork slots.

12. A locking fondue assembly, comprising:

a pot assembly;

said pot assembly including a pot body and a pot lid;

snap lock first means at a top of said pot body for releasably securing said pot lid to said pot body;

a plurality of pot feet extending radially away from said pot body opposite said top of said pot body;

a stand assembly;

said stand assembly including a stand base spaced from a stand top by a plurality of stand legs;

locking second means for detatchably securing said pot assembly to said stand assembly;

said locking second means providing a rotational engagement between said plurality of pot feet and said stand assembly when said pot body is rotated in a locking direction, and also providing a rotational disengagement of said plurality of pot feet when said pot body is rotated in an opposing unlocking direction;

a burner assembly in said stand base opposite said pot assembly; and said burner assembly including third means for elastically securing a burner cup in a burner receptacle positioned coaxially to a central axis of both said pot assembly and said stand assembly, whereby said locking fondue assembly prevents unintended separation and increases safety during a use by interlocking said pot assembly with both said stand assembly and said burner assembly.

* * * * *